United States Patent [19]

Meisner et al.

[11] Patent Number: 5,186,366
[45] Date of Patent: Feb. 16, 1993

[54] GROUND COFFEE DISPENSER UTILIZING A METERING TRAP CHAMBER

[75] Inventors: Edward H. Meisner, Short Hills; Young C. Park, Palisades Park, both of N.J.

[73] Assignee: Eagle Affiliates, Inc., Brooklyn, N.Y.

[21] Appl. No.: 743,948

[22] Filed: Aug. 12, 1991

[51] Int. Cl.$^5$ .............................................. B67D 5/38
[52] U.S. Cl. ..................................... 222/158; 222/368
[58] Field of Search ............. 222/368, 456, 158, 465.1

[56] References Cited

U.S. PATENT DOCUMENTS

| | | | |
|---|---|---|---|
| 2,088,836 | 8/1937 | Brown | 222/368 X |
| 3,081,010 | 3/1963 | Tupper | 222/465.1 X |
| 3,512,681 | 5/1970 | Frankel | 222/158 |
| 3,765,574 | 10/1973 | Urquiza | 222/465.1 X |
| 4,957,224 | 9/1990 | Kessler et al. | 222/465.1 |
| 4,961,521 | 10/1990 | Eckman | 222/158 X |

*Primary Examiner*—Gregory L. Huson
*Attorney, Agent, or Firm*—Caesar, Rivise, Bernstein, Cohen & Pokotilow, Ltd.

[57] ABSTRACT

Apparatus for dispensing a metered amount of ground coffee. The apparatus comprises a housing and a rotatable metering assembly. The housing has a storage chamber for the coffee and an isolated passageway terminating in a spout. The storage chamber has an outlet at its bottom. The metering assembly includes plural metering chambers located below the outlet of the storage chambers and which, when the assembly is rotated, brings a number of them under the outlet, whereupon the particulate material flows therein. The housing also has a wiper disposed at the outlet to wipe extra particulate material from the filled metering chambers as the metering assembly is rotated so that they do not overflow. The rotation of the metering assembly to selected rotational positions brings a selected number, i.e., one or more, of the filled receiving chambers into communication with the passageway, whereupon the user of the apparatus may invert it so that the coffee from the one or more receiving chambers flows into the passageway at one time to exit at the spout. The housing also includes a pair of covers, pivotally connected to each other, for closing off the cavity and the pouring spout.

7 Claims, 3 Drawing Sheets

GROUND COFFEE DISPENSER UTILIZING A METERING TRAP CHAMBER

This invention relates generally to dispensers and more particularly to devices for dispensing measured quantities of particular materials, such as ground coffee.

BACKGROUND OF THE INVENTION

Various dispenser have been disclosed in the patent literature for holding particulate material therein to enable it to be dispensed in metered amounts therefrom. For example, in U.S. Pat. No. 4,805,811 there is disclosed a hand-held device for dispensing metered amounts of pharmaceuticals. The device includes a storage chamber, a rotatable dosing unit located below the storage chamber, an operating unit to rotate the dosing unit with respect to the storage chamber. The dosing unit includes plural upwardly opening recesses which communicate individually and sequentially with the storage chamber via an outlet. Resilient scrapers are disposed within the outlet immediately above the recesses to pack and level the particulate material into to recesses as the dosing unit is rotated. The dispenser includes a dispensing tube in communication with the dosing unit so that each recess can be brought into selective communication with the tube to enable the contents thereof to flow through the dispensing tube out a hole at the top end thereof when the dispenser is inverted.

In U.S. Pat. No. 4,893,737 (Brojesson) there is disclosed a hand-held device for dispensing metered amounts of ground coffee. The dispenser has a container with a discharge opening it its bottom. A rotor covers the bottom and has vanes which define a plurality of dispensing compartments. A wiper covers the rotor in the vicinity of the discharge opening and tapers upward at a steep angle so that hard packed coffee will slide downward. A drive mechanism is provided to move one dispensing compartment at a time to the discharge opening so that the coffee can drop thereout.

In U.S. Pat. No. 3,007,612 (Tepper) there is disclosed a device for mounting on a coffee can to dispense metered amounts of ground coffee. The dispenser has a rotatable member including plural coffee receiving cavities so that one or more cavities can be filled and dispensed by inverting the combination.

Examples of other particulate material dispensers are found in the following U.S. Pat. No. 2,196,721 (Boyle), U.S. Pat. No. 3,018,924 (Reed), U.S. Pat. No. 3,308,995 (Lee), U.S. Pat. No. 4,674,660 (Botto), U.S. Pat. No. 4,821,929 (Srisathapat), U.S. Pat. No. 4,867,350 (Zelickson), and U.S. Pat. No. 4,892,233 (Zelickson).

While the foregoing prior art devices may be suitable for their intended purposes each still leaves much to be desired from one or more standpoints, e.g., ability to dispense preselected multiple quantities of a particulate material at a single time, ease of use, simplicity of construction, aesthetically pleasing appearance.

OBJECTS OF THE INVENTION

Accordingly, it is the general object of this invention to provide a dispenser for dispensing metered amounts of a particulate material, such as ground coffee, which overcomes the disadvantages of the prior art.

It is a further object of this invention to provide a dispenser which is easy to use for metering and dispensing predetermined amounts of ground coffee.

It is still a further object of this invention to provide a easily manually manipulatable dispenser for storing ground coffee therein, and which can be readily used to meter and dispense precise amounts of coffee therefrom.

It is yet a further object of this invention to provide a dispenser for storing and dispensing precisely metered amounts of ground coffee which is simple in construction, relatively low in cost, easy to use, and aesthetically pleasing in appearance.

SUMMARY OF THE INVENTION

These and other objects of the instant invention are achieved by providing apparatus for dispensing a metered amount of particulate material, e.g., ground coffee, therefrom, comprising a housing and metering means. The housing comprises a storage cavity for receipt of the particulate material and a dispensing passageway isolated from the cavity. The cavity has a bottom outlet. The metering means comprises plural receiving chambers located below the outlet. The metering means is rotatable about an axis to predetermined rotational positions to bring at least one, but less than all, of the receiving chambers under the outlet so that particulate material in the cavity may flow therein through the outlet to fill those chambers.

The housing includes means, e.g., a wiper, disposed adjacent the outlet and arranged to coact with the receiving chambers as the metering means is rotated so that only a predetermined amount of particulate material is located within the each of the filled receiving chambers, e.g., each of the plural chambers is filled to capacity and no more.

The rotation of the metering means to selected ones of the predetermined rotational positions brings one or more of the filled receiving chambers into communication with the dispensing passageway. Once this has occurred the apparatus may be inverted by the user, whereupon the particulate material within the filled receiving chamber(s) in communication with the dispensing passageway may flow therethrough for egress, e.g., pouring, from the apparatus.

DESCRIPTION OF THE DRAWINGS

Other objects and many of the attendant advantages of this invention will be readily appreciated as the same becomes better understood by reference to the following detailed description when considered in connection with the accompanying drawings wherein.

DETAILED DESCRIPTION OF THE PREFERRED EMBODIMENT

Figure 1:
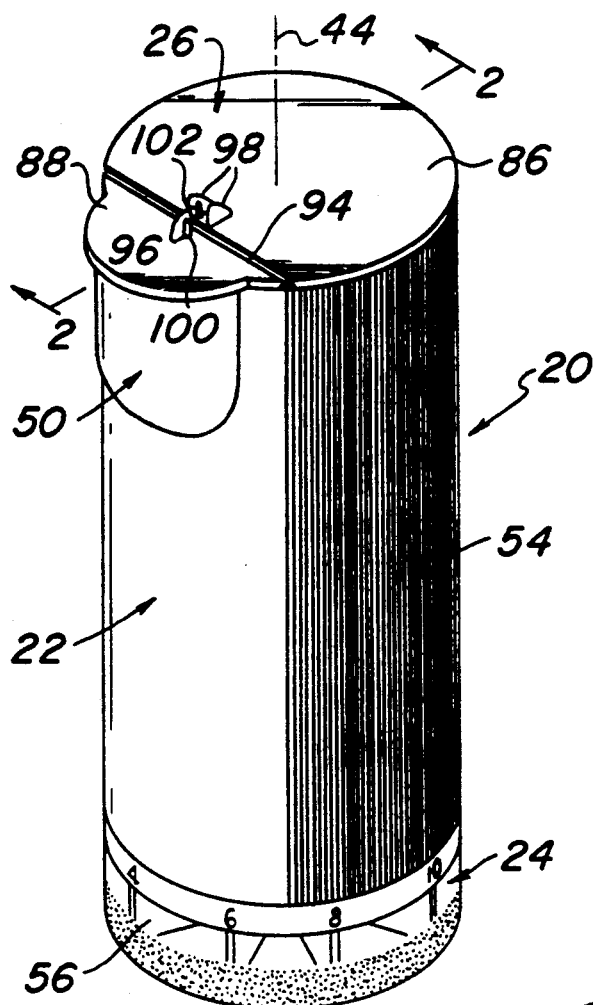
FIG. 1 is a perspective view of the ground coffee dispenser of the subject invention.

Referring now in detail to the various figures of the drawing wherein like reference characters refer to like parts, there is shown at 20 in FIG. 1 a self-contained device for metering and dispensing particulate materials, such as ground coffee, constructed in accordance with the subject invention. The coffee dispenser 20 basically comprises a housing 22, a metering assembly 24 and a cover 26.

As can be seen clearly in FIGS. 2-5, the housing is a hollow tubular member arranged to be held in the user's hand to dispense the ground coffee. The housing includes a spout 50 (to be described later) through which a user-selectable, precisely metered amount of ground coffee may be poured for brewing. The housing has a circular sidewall 28 which is divided by an intermediate wall 30 to form a large storage cavity or chamber 32 and a pouring passageway 34. The bottom of the storage chamber 32 is open, as is the bottom of the pouring passageway 34. The upper end of the intermediate wall 30 extends at an angle to the longitudinal central axis 44 of the housing so that it is disposed close to the spout 50 at the top of the housing and close to the center of the housing at the bottom of the housing. The intermediate wall terminates at its lower end a pair of linear edges 40 and 42 which project outward radially from a centrally located circular socket (See FIG. 40).

The linear wall edges 40 and 42 form two peripheral portions of an outlet or opening 46 (FIGS. 3 and 4) at the bottom of the storage chamber 32. The other peripheral portion of the outlet 46 is formed by the lower peripheral edge 48 of the portion of the sidewall 28 located between the ends of the two wall edges 40 and 42. Thus, the outlet or opening 46 is of a general pie or wedge-like shape.

The spout 50 is located at the upper end of the housing 22 and is in the form of a bulbous portion of the sidewall 28 projecting outward radially. A recess 52 (FIGS. 2 and 3) extends along virtually the entire height of the housing's sidewall located diametrically opposite the spout. The recess 52 serves as a convenient means for facilitating the grasping of the device in the user's hand (i.e., it acts to receive the user's fingers). To further facilitate the grasping of the device 20 the outer surface of the housing's sidewall on each side of the recess 52 includes a multitude of shallow, very closely spaced grooves to form respective non-slip surfaces 54 (FIG. 1).

The storage chamber 32 is arranged to receive and store particulate, pourable materials, e.g., ground coffee, and to dispense that material via its outlet 46 into the metering assembly 24. The metering assembly 24 is arranged to be rotated with respect to the housing about axis 44 to selectively transport one or more metered quantities of the coffee to the bottom of the pouring passageway 34. By so doing, when the apparatus 20 is inverted by the user the metered quantities of dispensed coffee may then flow down the passageway 34 to the spout 50 and out of the apparatus. The details of the metering assembly 24 will now be discussed with reference to FIGS. 2, 3, 5 and 6. Thus, as can be seen therein (and particularly in FIG. 2), the metering assembly 24 basically comprises an annularly shaped base member 56 having an outer sidewall 58 of the same radius as the sidewall 28 of the housing, a small diameter central sidewall 60, and a flat or planar base wall 62 interconnecting the two sidewalls 50 and 60. A plurality, e.g., eight, radially extending walls 64 are disposed between the outer sidewall and the inner sidewall to form eight, pie or wedge-shaped metering chambers 66. Each of the chambers 66 is arranged to receive ground coffee from the storage chamber 32 and is of the same size and capacity as the other chambers. For example, in a commercial embodiment of the device 20, each chamber 66 is constructed to hold sufficient ground coffee to brew two cups.

The top edge of each of the radially extending walls 64 lie in the same plane as the top edge of the outer and inner circular sidewalls 58 and 60, respectively, and are arranged to be engaged by the lower peripheral edges 40 and 42 of the intermediate wall 32 of the housing 22 to scrape or wipe off any excess coffee in the metering chambers 66 as will be described later.

The rotatable securement of the metering assembly 24 to the housing 22 is effected by a connector 68. The connector 68 basically comprises a horizontally disposed wall 70 located within the interior of the small diameter sidewall 60 closely adjacent the upper edge of the metering assembly to form a circular recess in which the socket 38 is disposed. A hollow hub 72 extends upward from the wall 70 coaxial with the central longitudinal axis 44. The hub is arranged to be snap-fit within a central opening 78 in the wall 70 at the center of the metering assembly. Thus, the hub is split into two portions by means of a pair of vertically oriented, diametrically opposed slots 74. The outer periphery of each of the two portions of the hub adjacent its top includes a projecting ear 76.

Figure 6:
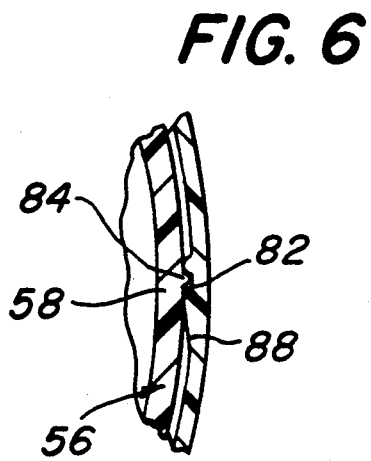
FIG. 6 is an enlarged sectional view of the portion of the device shown within the circled area designated by the legend "FIG. 6" in FIG. 5.
Figure 5:
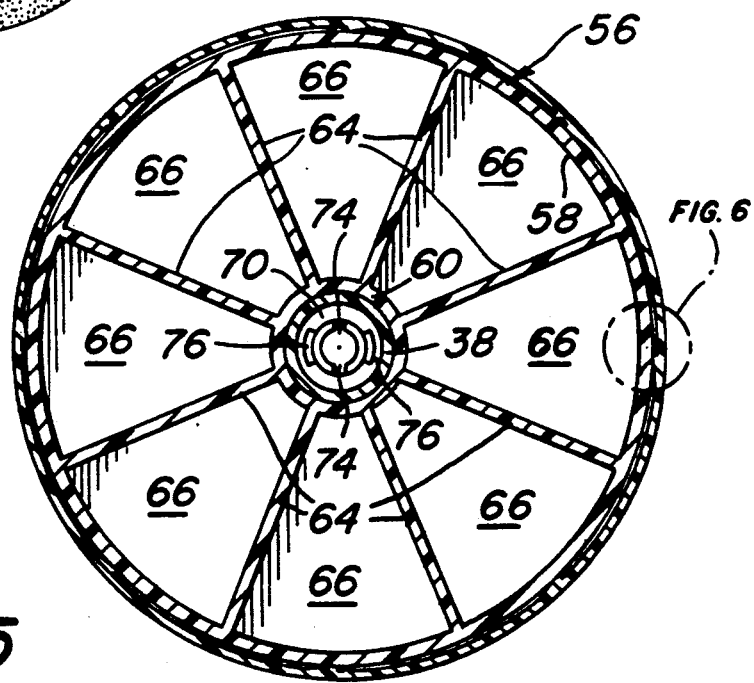
FIG. 5 is a sectional view taken along line 5—5 of FIG. 2.
Figure 2:
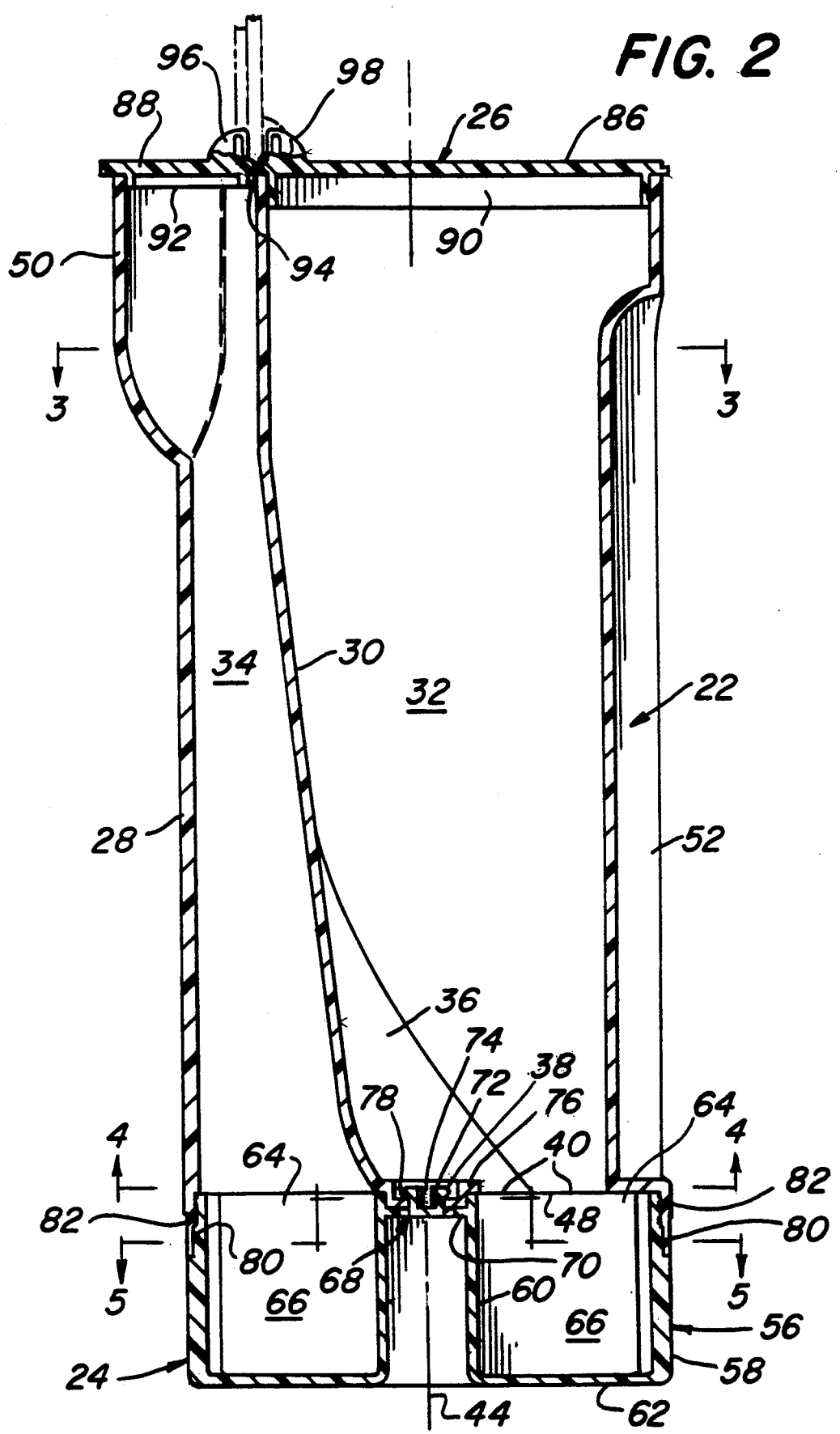
FIG. 2 is an enlarged sectional view taken along line 2—2 of FIG. 1.
Figure 3:
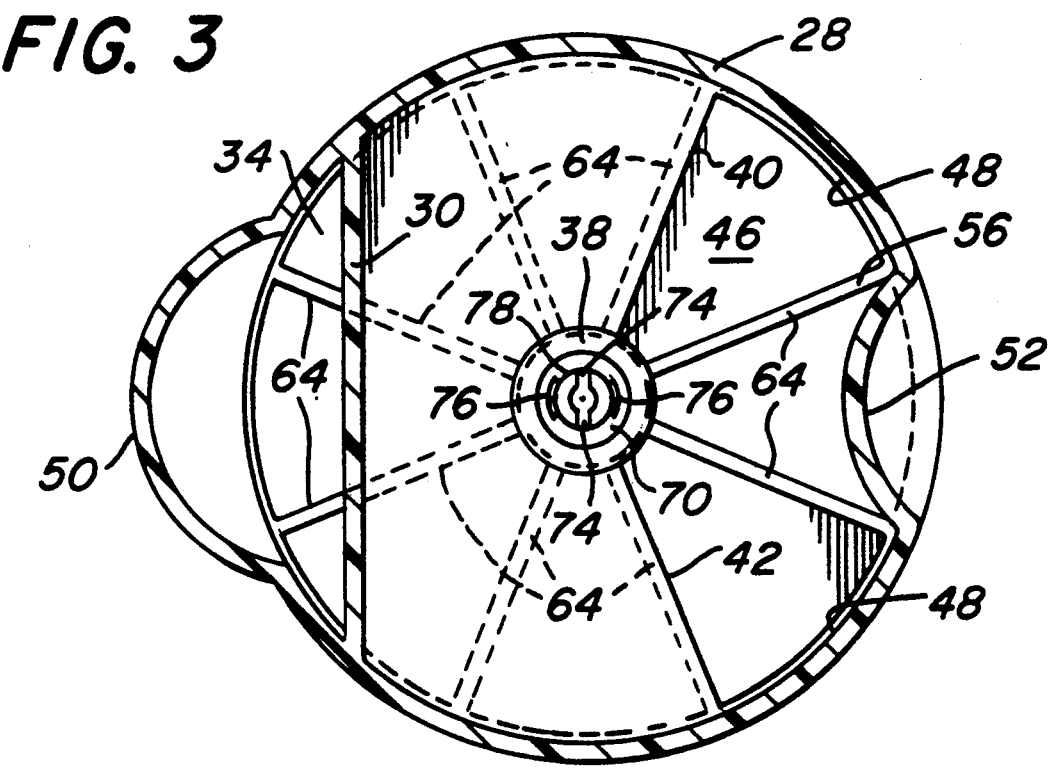
FIG. 3 is a sectional view taken along line 3—3 of FIG. 2.
Figure 4:
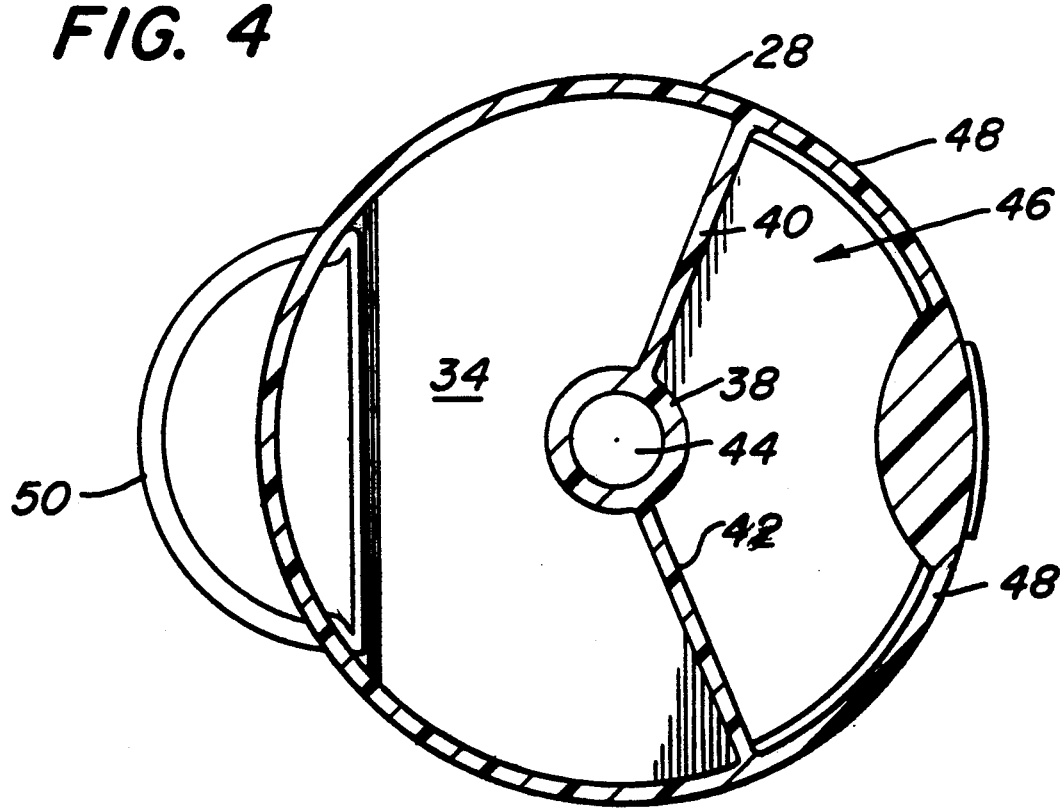
FIG. 4 is a sectional view taken along line 4—4 of FIG. 2.

The metering assembly 24 is connected to the housing as shown in FIGS. 2, 5 and 6 by disposing the lower peripheral edge 82 of the housing's sidewall 28 in an annular recess 80 in the upper edge of the outer periphery of the outer sidewall 58 of the metering assembly.

The metering assembly 24 is arranged to be rotated about the axis 44 with respect to the housing 22 to predetermined rotational positions so that one or more of its metering cavities 66 which have been filled with ground coffee from the coffee storing chamber 32 can be brought into communication with the lower end (entrance) of the pouring passageway 34. This ensures that one or multiple, metered amounts of coffee can be dispensed from the apparatus in a single operation (i.e., at one time) by merely inverting the apparatus (as will be described later).

In order to hold the metering assembly at any of the desired rotational positions with respect to the housing, a detent assembly (FIG. 6) is provided. The detent assembly basically comprises a small rib 84 and associated recesses 86. The rib 84 is located on the outer surface of the sidewall 58 of the housing. The rib is oriented vertically and is arranged to cooperate with any of plural, equidistantly spaced vertically oriented recesses 86 on the inner surface of the sidewall portion 82 of the housing. Each recess 86 is formed by a projection from the inner surface portion 82 with that projection including an inclined surface 88 leading to the recess 86. Accordingly, as shown in FIGS. 5 and 6, when the metering assembly 24 is rotated in a counter-clockwise direction about axis 44 with respect to the housing 22, the rib 84 rides up the inclined surface 88 until it snap-fits within the associated recess 86. This action holds the metering assembly 24 stationary with respect to the housing 22. The rib and engaging recess are sufficiently shallow such that further rotation of the housing in the counter-clockwise direction causes the rib to slide out of the recess, thereby enabling the metering assembly to be rotated to the next rotational position whereupon the rib enters the recess located thereat.

The sidewall 58 of the metering assembly 24 is preferably transparent, e.g., the metering assembly is formed of a transparent plastic, to enable the interior of the metering chambers 66 to be seen by the user. Numerical indicia representing the various metered amounts of coffee which may be dispensed by the apparatus 20 are provided at equidistantly spaced locations about the periphery of bottom of the housing to facilitate the dispensing of a desired quantity of coffee, as will be described later.

In order to ensure that no more than the desired quantity of ground coffee is contained within each of the metering chambers 66 the wiper edges 40 and 42 at the lower edge of the intermediate wall 30 to sweep or scrape across the top surfaces of the radially projecting walls 64 interposed between each of the metering chambers 66 as the metering assembly is rotated with respect to the housing. Accordingly, as each metering chamber 66 passes from the position where it is disposed under the storage cavity's outlet 46 to a position where it is disposed in communication with the bottom (inlet) of the pouring passageway 34, the metering chamber 66 will be completely full of ground coffee.

As should be appreciated from the foregoing, the apparatus 20 enables the filling of more than one metering chamber at any one time. Moreover, one or more, e.g., up to five chambers, can be placed in communication with the inlet of the pouring passageway 34 at any one time. Thus, the apparatus is able to dispense at a single time the contents of one, two, three, four, or five filled metering chambers 66. Since each chamber 66 when full holds a measured amount of ground coffee sufficient to brew two cups, the apparatus can thus dispense metered amounts to brew either two, four, six, eight or ten cups of coffee in a single operation. The indicia appearing about the periphery of the bottom of the housing represents the desired amount of coffee to be dispensed by the device. In particular the respective indicia are located on the periphery of the housing at predetermined positions so that when the metering assembly is rotated to a desired rotational position represented by a particular numerical indicia, the apparatus is arranged to dispense the amount of coffee represented by that indicia. Thus, if it is desired to dispense coffee to brew six cups, the metering assembly is rotated to the "six" position, whereupon the first, second and third of the metering chambers 66 are located under the outlet 46 of the storage chamber 32. This causes the coffee held within the chamber to drop through its outlet 46 into each of the three metering chambers 66 disposed thereunder. In order to dispense the contents of those chambers out of the apparatus 20 the metering assembly 24 is then rotated three additional rotational positions to carry the three filled metering chambers 66 into communication with the inlet of the pouring passageway 34. The rotation of the metering assembly through those three rotational position causes the wiping edges 40 and 42 of the housing's intermediate wall to sweep across the top surfaces of the sidewalls of the metering chambers 66, thereby ensuring that each chamber is filled to its capacity and no more. Since the three chambers full of coffee are now in communication with the pouring passageway 34, all that is required is for the user to invert the apparatus 20, whereupon the contents of the three metering chambers may flow out of those chambers down through the pouring passageway 34 and out through the spout 50.

If only two cups of coffee are desired to be brewed then only one full metering chamber 66 need be brought to the pouring passageway. Thus, in such a case, although the chambers are filled, the metering assembly is rotated only one rotational position, whereupon the first of the three receiving chambers which are filled is brought into communication with the inlet to the pouring passageway. If more than three chambers are desired to be dispensed then the metering assembly is rotated to whatever desired number of rotational positions necessary to bring that number of filled metering chambers 66 in communication with the inlet to the pouring passageway 34.

Inasmuch as the outlet 46 covers three of the eight chambers, while the inlet to the pouring passageway 34 is in communication with five of such chambers, only five metered amounts can be dispensed at any one time. If more than five are desired to be dispensed at any one time then the size of the outlet must be correspondingly reduced, e.g., if six are to be dispensed at one time then the outlet must be configured to only overlie two of the receiving chambers 66.

It should thus be appreciated that by suitable dimensioning of the outlet 46 of storage cavity 32 and the inlet to the pouring passageway 34 one can design an apparatus to dispense any desired multiple of a metered amount of coffee therefrom. This can also be accomplished by varying the volumetric capacity of the metering chambers 66.

In order to seal the upper end of the storage cavity 32 and to also close the spout 50, the cover 26 is provided. The cover basically comprises two sections, namely, cavity cover section 86 and spout cover section 88. Each cover section is a generally planar member, whose outer periphery generally conforms to the upper edge of the housing. A flange 90 (FIG. 2) projects downward from the cavity cover section 86 and is arranged to be snugly received within the upper end of the storage cavity 32. This ensures that when the cover section 86 is closed the ground coffee within the chamber 34 is kept fresh. A flange 92 is located on the underside of the spout cover section 88.

The cover 26 is arranged to be releasably mounted on the housing. The two cover sections 86 and 88 are pivotally connected to each other via a living hinge 94 (FIG. 2). A retainer in the form of a finger 96 projects upward from the cover section 88 over the spout 50. The finger 96 is arranged to fit snugly between a pair of fingers 98 projecting upward from the cavity cover section 86. The fingers 98 are spaced from each other by approximately the thickness of the finger 96 on the spout section. The finger 96 includes a pair of ears 100 extending from opposite sides thereof arranged to be disposed between associated ears 102 in the fingers 98 to hold the spout cover section open and/or to hold the cavity cover section open. The phantom lines in FIG. 2 show both sections held open.

Without further elaboration, the forgoing will so fully illustrate our invention that others may, by applying current or future knowledge, readily adopt the same for use under various conditions of service.

What is claimed is:

1. Apparatus for dispensing a metered amount of particulate material therefrom comprising a housing and metering means, said housing comprising a storage cavity for receipt of particulate material therein and a passageway isolated from said cavity, said passageway and said cavity being separated from said other by an intermediate wall, said passageway having an outlet in the form of a spout, said spout having a pivotable lid with means for releasably holding said pivotable lid in an open position to permit said particulate material to pass through said spout when said lid is open, said storage cavity having a bottom outlet, an inlet located adjacent the top of the storage cavity and a cover, said inlet serving to introduce said particulate material into said storage cavity, said cover being arranged to pivotally close said inlet to said storage cavity and to be releasably held in the closed position, said cover and said lid being arranged to be pivotally secured to one another, said metering means comprising plural receiving chambers disposed below said bottom outlet, said metering means being rotatable about an axis to predetermined rotational positions to bring at least one of said receiving chambers under said bottom outlet so that particulate material in said cavity may flow therein via said bottom outlet, said receiving chambers having side walls separating them from one another, with each of said side walls having a top surface in the same plane as the top surface of the other side walls, said metering means additionally comprising wiping means to wipe the top surface of said side walls as said metering means is rotated, whereupon each of said predetermined plurality of receiving chambers is filled with a predetermined amount of particulate material and is prevented from being filled up to more than said predetermined amount, wherein each of said rotational positions are releasably maintainable in a predetermined position by detent means, so that one or more of said selected filled receiving chambers are in communication with said passageway at one time, said rotational of said metering means to selected ones of said rotational positions bringing a selected number of said filled receiving chambers into communication with said passageway, whereupon inversion of said apparatus causes the particulate material within said selected ones of said filled receiving chambers to pass into said passageway for egress from said apparatus.

2. The apparatus of claim 1 wherein each of said chambers is arranged to hold a predetermined amount of ground coffee therein.

3. The apparatus of claim 1 wherein said cover and said lid are releasably securable to said housing.

4. The apparatus of claim 1 additionally comprising grasping means on said housing to facilitate the manual holding and inversion of said apparatus.

5. The apparatus of claim 1 wherein said metering means comprises transparent portions to enable the user of said apparatus to see the condition of said receiving chambers.

6. The apparatus of claim 1 wherein said wiping means comprises a peripheral edge of said bottom outlet.

7. The apparatus of claim 6 wherein said wiping means comprises the lower end of said intermediate wall.

* * * * *